United States Patent [19]

Farmer et al.

[11] Patent Number: 5,969,667
[45] Date of Patent: Oct. 19, 1999

[54] RADAR SYSTEM

[75] Inventors: Michael E. Farmer, West Bloomfield; Craig S. Jacobs, Farmington Hills, both of Mich.

[73] Assignee: Automotive Systems Laboratory, Inc., Farmington Hills, Mich.

[21] Appl. No.: 09/173,322

[22] Filed: Oct. 15, 1998

Related U.S. Application Data

[60] Provisional application No. 60/066,025, Oct. 16, 1997, and provisional application No. 60/071,964, Jan. 20, 1998.

[51] Int. Cl.⁶ .................................................. G01S 13/00
[52] U.S. Cl. .......................... 342/165; 342/194; 342/70
[58] Field of Search ................................... 342/165, 194, 342/89, 70

[56] References Cited

U.S. PATENT DOCUMENTS

| | | | |
|---|---|---|---|
| 2,147,810 | 2/1939 | Alford | 250/1 |
| 2,453,169 | 11/1948 | Varian | 343/14 |
| 2,520,553 | 8/1950 | Lawson | 343/14 |
| 2,909,656 | 10/1959 | Meyer | 250/27 |
| 3,187,330 | 6/1965 | Boles et al. | 343/8 |
| 3,256,520 | 6/1966 | Blitz | 343/14 |
| 3,703,004 | 11/1972 | Slater | 342/194 |
| 4,044,357 | 8/1977 | Goldie | 343/17.5 |
| 4,325,138 | 4/1982 | Zscheile, Jr. | 375/1 |
| 4,682,175 | 7/1987 | Lazarus | 342/165 |
| 4,725,842 | 2/1988 | Mayberry | 342/198 |
| 4,825,214 | 4/1989 | Dejaegher | 342/128 |
| 4,968,967 | 11/1990 | Stove | 342/165 |
| 4,970,519 | 11/1990 | Minnis et al. | 342/165 |
| 5,191,337 | 3/1993 | Brovko et al. | 342/160 |
| 5,428,837 | 6/1995 | Bayruns et al. | 455/317 |
| 5,657,021 | 8/1997 | Ehsani-Nategh et al. | 342/70 |
| 5,861,837 | 1/1999 | Richardson et al. | 342/198 |

OTHER PUBLICATIONS

Radar CFAR Thresholding in Clutter and Multiple Target Situations; Herman Rohling; ISEE Transactions on Aerospace and Electronic Systems; vol.AES–19, No. 4; Jul. 1983.

*Primary Examiner*—Daniel T. Pihulic
*Attorney, Agent, or Firm*—Lyon, P.C.

[57] ABSTRACT

A leakage calibration and removal system and method estimates the complex in-phase and quadrature phase (I/Q) components of a leakage signal for each beam location in the sampled down-converted radar signal in a radar system (10). In a digital embodiment, the stored leakage calibration signal (264) is subtracted (206) from the sampled radar signal, and the resultant signal is processed (208, 210, 212) to detect targets. A leakage calibration process (250) is activated if a leakage signal test (214) indicates a problem for a sufficient number of consecutive scans (216), wherein for each beam location, M consecutive I/Q waveforms are averaged (252), known targets are removed (254, 256, 258), and the resulting signal is scaled (262) and stored (264) as a new leakage calibration signal if the variance is within acceptable limits (262). In a hybrid embodiment, the stored leakage signal (364) is converted to analog form (366), subtracted (301) from the analog down-converted radar signal (300), and scaled by a variable gain (303) before the complex I/Q components are sampled therefrom (302, 304). A leakage calibration process (350) is activated every Nth scan (316), wherein for each beam location, M chirp waveforms are averaged (352) and checked for variance (354). If the variance is within acceptable limits, the leakage signal is updated by a Kalman Filter (356), stored as the new leakage calibration signal (364), and the Kalman gain matrices are updated (358).

32 Claims, 5 Drawing Sheets

RADAR SYSTEM

CROSS-REFERENCE TO RELATED APPLICATIONS

The instant application claims the benefit of prior U.S. Provisional Application Ser. No. 60/066,025 filed on Oct. 16, 1997.

The instant application also claims the benefit of prior U.S. Provisional Application Ser. No. 60/071,964 filed on Jan. 20, 1998.

TECHNICAL ART

The instant invention generally relates to radar systems and more particularly to systems and methods for mitigating the effect of the leakage of radar energy from the transmitter to the receiver in a continuous wave radar system.

BACKGROUND OF THE INVENTION

A radar system measures the distance and/or velocity of a target by sensing the effects of the interaction of the target with a beam of either continuous or pulsed electromagnetic energy. In a linear frequency modulated continuous wave (LFM CW) radar system, the target is continuously illuminated with electromagnetic energy, the frequency of which is linearly modulated in time in accordance with a periodic pattern. The radar receiver measures the distance to the target from the difference in frequency between the received and transmitted signals. One problem with LFM CW radar systems results from leakage of a portion of the transmitted energy that is directly coupled to the receiver without first interacting with a target so as to alias as a stationary near range target. The strength of this leakage signal can be sufficiently great that sidelobes thereof mask the target return signals. Radar systems that incorporate a single antenna for both transmit and receive are particularly susceptible to such leakage problems.

Some prior art linear frequency modulated continuous wave (LFM CW) radar systems, including many automotive CW applications, use separate antennas for transmitting and receiving the radar signals. While separate antennas substantially reduces the problem of leakage, the primary difficulty with this method is that the use of separate transmit and receive antenna arrays can prohibitively increase the cost and size of the system.

Other prior art CW radar systems remove the leakage component in the received signal by mixing the received signal with a portion of the transmitted signal that has been shifted in phase by a fixed analog delay line. The analog delay line must be correctly matched to the leakage. The problem with this approach is that the delay of fixed analog delay line is not responsive to changes in the leakage that may result from temperature variations, etc. The problem with analog delay lines is compounded in multiple beam aperture (MBA) architecture radar systems, wherein each beam can have a distinct leakage path and correspondingly requires a separately delayed signal to compensate for the associated leakage. With an increasing number of beams, the corresponding number of delay lines and associated high speed switches—that switch to the correct delay line for the given beam number—can become prohibitively expensive and cumbersome.

Yet other prior art radar systems attempt to reduce the effect of the leakage signal in the final signal processing stage by either heavily weighting the data prior to Fourier Transform processing or else by ignoring the first N range cells of data from the Fourier Transform. The problems with stronger amplitude weighting of the Fourier transform to reduce the sidelobe levels is that this causes significant broading of the peaks, which can reduce the system's ability to recognize closely spaced targets and consequently targets close to the radar system (and the host vehicle). Clearly, the problem with ignoring the first N range cells is that for automotive collision prediction and avoidance radars the near range information is vital in estimating the time to collision, and the likelihood of collision.

Still yet other systems use a pulsed radar rather than a CW radar, whereby the receiver is gated to ignore the leakage signal. When applied to automotive collision prediction, a pulsed radar system requires very short radar pulses (<6 nanoseconds) to detect targets at very near range, which short pulses are difficult to transmit with sufficiently high power to detect far range targets. Accordingly, pulsed radar systems are currently not suited for detecting targets at both near and far ranges as necessary for automotive collision prediction.

SUMMARY OF THE INVENTION

The instant invention overcomes the above-noted problems by providing a real-time system and method for calibrating and removing the leakage signal in a Linear Frequency Modulated (LFM) Continuous Wave (CW) radar, particularly for automotive applications requiring multiple beam antenna apertures. The actual waveform that is employed is a stepped frequency synthesis of the LFM where every incoming data point corresponds to the response of the environment to that particular frequency value. The calibration is designed to estimate the leakage signal principally due to a common antenna aperture being used for transmitting and receiving radar energy and to provide a means for removing the signal to improve target detectability. The leakage signal results principally from reflection and transmission from internal radar components and imperfections. Since the path traveled by the leakage signal is very short, it is nearly always of significantly higher amplitude (e.g. 40–80 dB) than the actual targets. This has the negative effect of causing the leakage signal to actually mask smaller targets since the Fourier Transform processing of the signal is then dominated by the sidelobes of the leakage which are of roughly equal amplitude of the target. If the estimated leakage signal as a result of the calibration process is incorrect, then the amplitude of the measured leakage signal will grow and the signal may also experience a drift in frequency which will cause it to move in range and now appear as two closely spaced peaks, rather than a single peak. In addition, false targets may appear further out in range due to harmonics generated at the various mixer stages within the radar transmitter subsystem.

For broad area scanning radar systems that may require multiple antenna beams, a leakage signal for each unique path that the radar energy may travel in order to generate the multiple beams must be computed. In addition, the leakage must be computed during each use since the signal may change due to environmental differences such as large temperature variations. In addition, if debris such as mud is heavily caked on the antenna radome, then it can cause additional reflections, as well as increased attenuation, and this return signal would contribute as yet more effective leakage signal.

In one mode of operation of the instant invention, the leakage calibration process collects the leakage signal in real-time as needed based on the signal amplitude of the residual signal after the assumed leakage is removed. In another mode of operation, the leakage process collects the leakage signal continuously, but at a reduced data rate, for example every 50–100 scans. In yet another mode of operation, the leakage signals are collected any time there is no significant signal amplitude other than the leakage within a given antenna beam, which provides the advantage that whenever there is no signal the processor has free time to perform the calibration since it is not processing reports. The calibration process involves collecting a number of instances of the leakage signal and generating an average signal to be used as the leakage calibration signal. In one embodiment, the collected leakage signal is then optimally combined with the previous leakage template through the use of a recursive linear estimator, namely a Kalman Filter on each data point in the LFM waveform.

In a hybrid analog/digital embodiment of the instant invention, the leakage signal is converted back to analog form and then subtracted from the incoming radar signal containing leakage and target information. The difference signal is then scaled with a variable gain, providing for a much larger system dynamic range than for prior art systems.

Accordingly, one object of the instant invention is to provide an improved means for storing and removing a leakage signal for each beam of an MBA architecture radar system.

A further object of the instant invention is to provide an improved means for ability to operating a radar system unattended over long periods of time and to overcome changes in the operating characteristics of the radar system due to environmental changes, system fatigue or non-critical parts failure which may change the system operating characteristics slightly and cause the leakage removal to be sub-optimal.

A yet further object of the instant invention is to provide an improved means for gathering the leakage signal information without placing the radar in a special operating mode that would preclude performing its required function of collision prediction.

A yet further object of the instant invention is to provide an optimal means for calibrating and removing the leakage signal.

A yet further object of the instant invention is to provide improved target detectability.

In accordance with these objectives, one feature of the instant invention is that the leakage signals are pre-computed and stored digitally in non-destructive memory.

Another feature of the instant invention is that a distinct leakage signal is stored for each distinct radar beam.

Yet another feature of the instant invention is that each distinct radar beam is calibrated separately.

Yet another feature of the instant invention is that the leakage removal process is continually monitored to test the need for re-calibrating the radar system.

Yet another feature of the instant invention is that the leakage removal process is continually operating as a background task within the processor of the radar system.

Yet another feature of the instant invention is that a dynamic calibration is performed as needed based upon the amplitude of the signal from which the leakage is removed, within the a priori known range of frequencies associated with the leakage.

Yet another feature of the instant invention is that if or when a re-calibration is required the system performs this function with no interruption of the system's primary mode of operation.

Yet another feature of the instant invention is that the newly acquired leakage data is optimally combined with the stored leakage data through optimal linear estimation techniques, namely Kalman filtering, based on the noise statistics of the specific radar and the previously modeled behavior of the system concerning leakage stability due to stability of the various components.

Yet another feature of the instant invention is the incorporation of a variable gain amplifier to maximize the signal strength of each beam of the MBA antenna array.

Yet another feature of the instant invention is that the system can use lower resolution analog to digital converters for equal or improved system performance.

Yet another feature of the instant invention is that the system tracks the time variation of the leakage digitally and then converts this to analog form for removal from the incoming signal.

Yet another feature of the instant invention is that leakage is removed individually for each beam and each beam's signal is scaled to the same amplitude to maximize the dynamic range for each beam anti thereby improve overall target detectability.

The specific features of the instant invention provide a number of associated advantages. One advantage of the instant invention with respect to the prior art is that by incorporating a digitally stored leakage signal there is no need for expensive and bulky delay lines for each beam nor is there a need for high speed RF switches to activate each of the delay lines.

Another advantage of the instant invention is that the associated calibration process requires no change in radar behavior and no operator intervention.

Yet another advantage of the instant invention is that even without a properly calibrated leakage signal, the system continues to operate, although in a slightly degraded mode, until the calibration is completed and the leakage is more fully removed.

Yet another advantage of the instant invention is that with dynamic testing of leakage performance, the system can readily self-adapt as environmental or operational characteristics of the radar change.

Yet another advantage of the instant invention is that with continuous leakage tracking and updating, the system can readily self-adapt as environmental or operational characteristics of the radar change.

Yet another advantage of the instant invention is that with conversion to analog form, analog subtraction, and analog gain, there is less noise due to quantization error.

Another advantage of the instant invention is that the system dynamic range can be improved by increasing the number of bits used in the digital to analog converter.

Yet another advantage of the instant invention is that the number of bits used in the analog to digital converter can be decreased without changing the noise due to quantization error, which provides for reduced system cost.

Yet another advantage of the instant invention is that by not interrupting the normal mode of operation of the system, the predictive collision radar sensor is able to continuously protect the vehicle and its passengers.

Yet another advantage of the instant invention is that by optimally combining the incoming data with the existing data the leakage removal process provides optimal target signal detectability and improved overall system performance.

Yet another advantage of the instant invention is that the associated radar system is relatively immune to environmental influences such as temperature, weather, and debris on radome etc.

Yet another advantage of the instant invention is that the system can collect leakage data even in the presence of targets.

The digital storage of the leakage signal provides a highly flexible and tunable system that can self-adapt to changes in the radar hardware environment that may lead to leakage signal characteristic changes. Further, the ability to continuously change the leakage and the ability to re-compute that leakage signal without interrupting the normal processing of the system provides for a very robust and reliable system as is required for automotive collision prediction.

These and other objects, features, and advantages of the instant invention will be more fully understood after reading the following detailed description of the preferred embodiment with reference to the accompanying drawings and viewed in accordance with the appended claims. While this description will illustrate the application of the instant invention in automotive collision prediction, it will be understood by one with ordinary skill in the art that the instant invention can also be applied to other radar applications where multiple beam apertures are operating in a CW mode of operation.

DETAILED DESCRIPTION OF THE PREFERRED EMBODIMENT(S)

Figure 1:
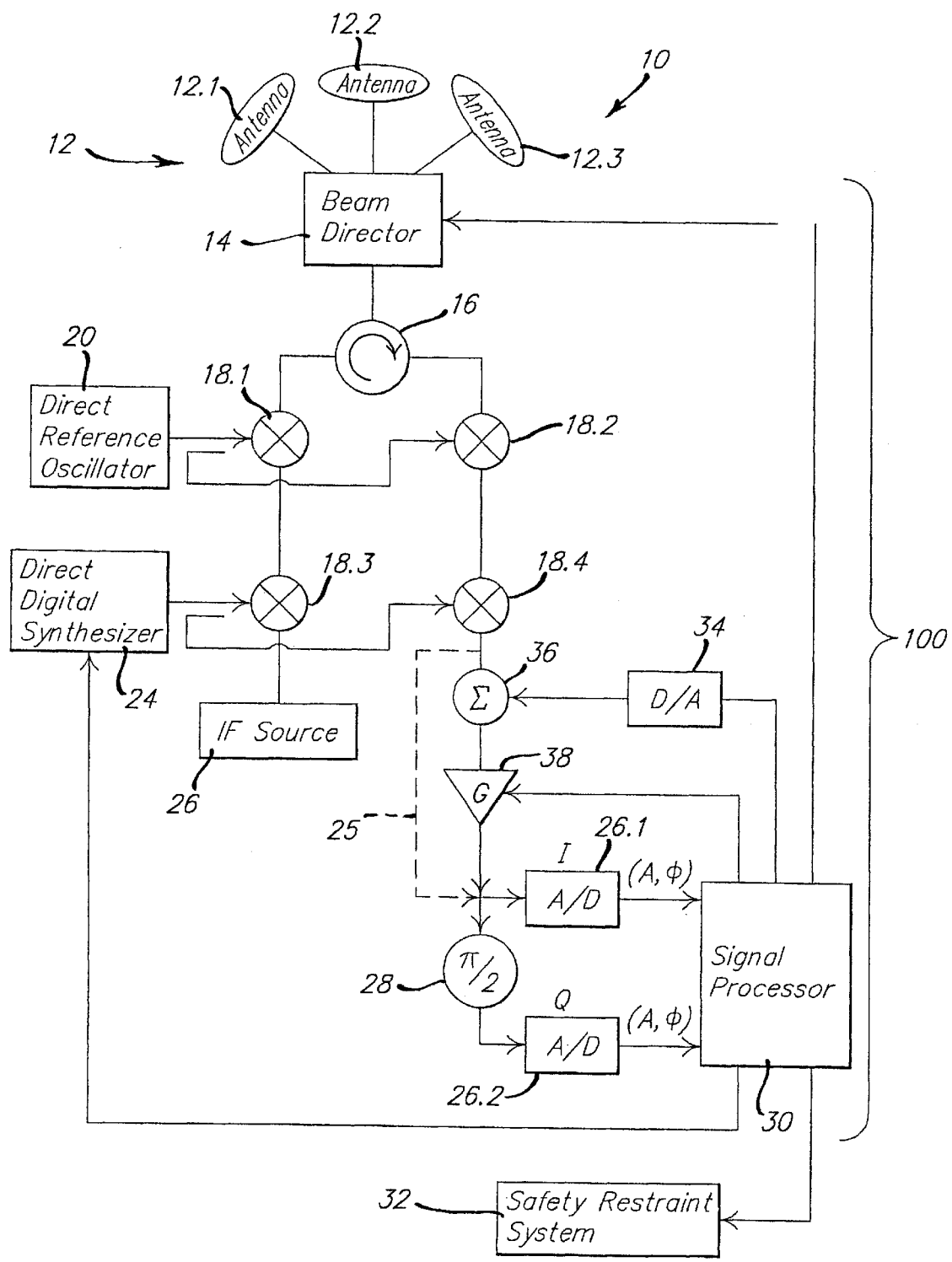
FIG. 1 illustrates a block diagram of the instant invention.

Referring to FIG. 1, a radar system 10 incorporates a direct digital synthesizer (DDS) 24 to synthesize a specific sequence of frequencies under the control of a signal processor 30. The direct digital synthesizer 24 varies the generated frequencies very quickly, for example by changing frequency within 40–100 nanosecond intervals. The direct digital synthesizer 24 may be developed from a single custom broadband device or from an off-the-shelf narrow band synthesizer with a comb filter network of offset frequencies which covers the entire desired frequency band, as is well understood by one having ordinary skill in the art. An intermediate frequency (IF) source 26 is mixed with the output of the direct digital synthesizer 24 by a mixer 18.3, and the output from the mixer 18.3 is further up-converted by mixing with the output from a direct reference oscillator (DRO) 20, or a Gunn diode, by a mixer 18.1 so as to produce an RF transmission signal having a frequency of approximately 47 GHz. The RF transmission signal passes through a circulator 16 into an antenna beam director 14 under control of the signal processor 30 which causes the signal to be transmitted by one or more of one or more antennas 12.1, 12.2, 12.3 so as to illuminate a region of interest proximate the vehicle 3. Either a plurality of fixed antennas 12.1, 12.2, 12.3, a single moveable antenna, or a phased array antenna may be incorporated without departing from the instant invention.

The transmitted signal is reflected from one or more either fixed or moving targets, and then received by the antenna system 12. The received signal is then directed by the circulator 16 to a mixer 18.2 which down-converts the signal by mixing with the output from a direct reference oscillator 20, and the down-converted signal is mixed with the output of the direct digital synthesizer 24 by a mixer 18.4 where it is further down converted so as to form a modulated IF radar signal.

In a first embodiment of the instant invention by which the leakage is calibrated and removed by purely digital means, the modulated IF radar signal follows path 25 and is phase shifted by a quadrature phase shifter 28, and both the modulated IF radar signal and the quadrature phase shifted version thereof are sampled by respective Analog to Digital converters 26.1, 26.2 (ADC) so as to provide the signal processor 30 with a complex measure comprising the amplitude and phase $(A,\phi)$ of the modulated IF radar signal.

In a second embodiment of the instant invention by which the leakage is compensated by a hybrid analog/digital means, a digital form of a leakage signal from the signal processor 30 is converted to analog form by a Digital to Analog converter 34 (DAC) and subtracted from the modulated IF radar signal. The resultant signal is scaled by an amplifier 38, the gain of which is under control of the signal processor 30. The scaled signal is then phase shifted by a quadrature phase shifter 28, and both the scaled signal and the quadrature phase shifted version thereof are sampled by respective Analog to Digital converters 26.1, 26.2 so as to provide the signal processor 30 with a complex measure comprising the amplitude and phase $(A,\phi)$ of the modulated IF radar signal.

In both embodiments, the signal processor detects the range and velocity of targets within the field of view of the radar system 10 and predicts whether or not a collision will occur, and if so, sends an appropriately time signal to control the activation of the safety restraint system 32 so as to mitigate injury to the occupant.

Figure 2:
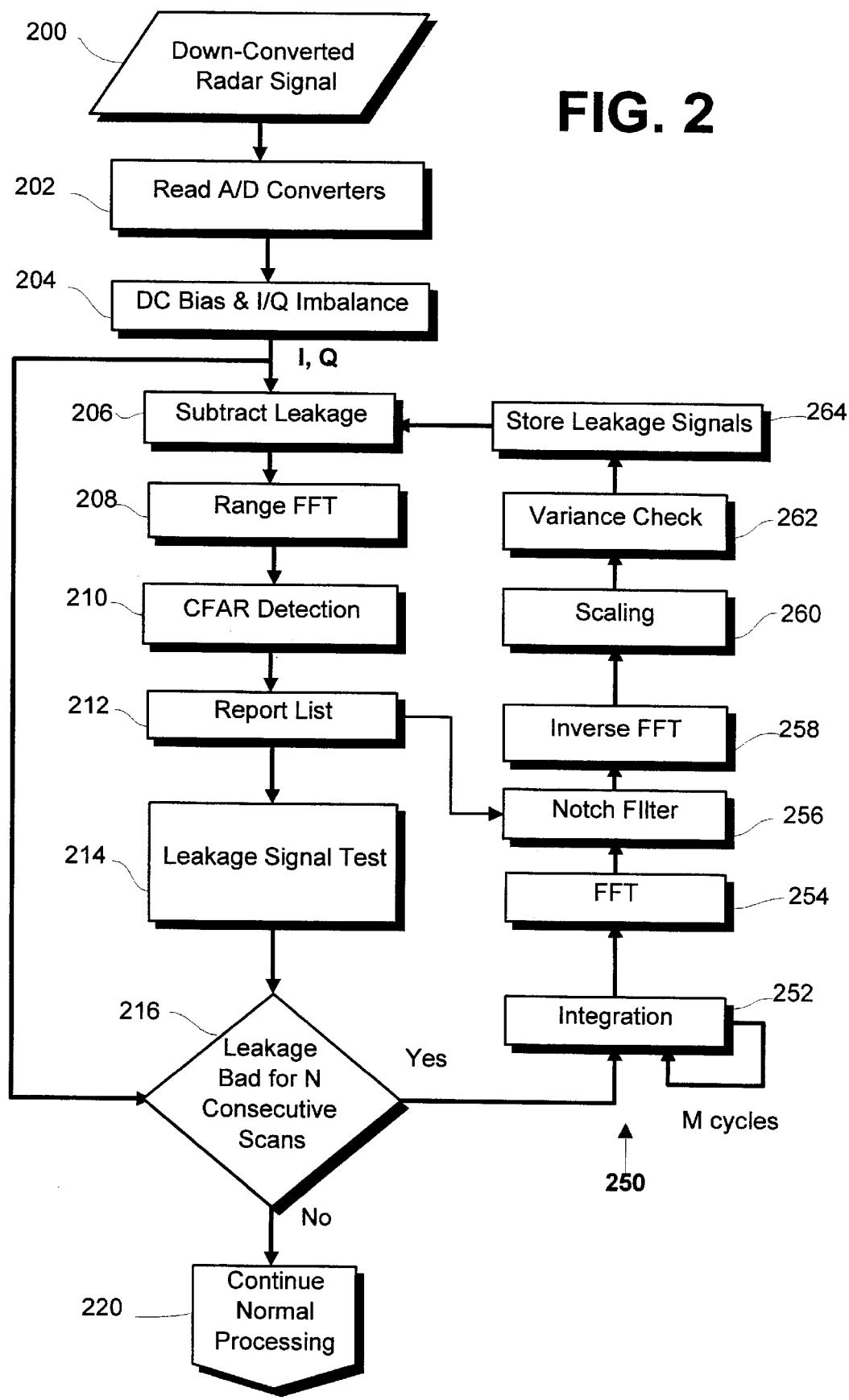
FIG. 2 illustrates a block diagram of signal processing in accordance with a first embodiment of the instant invention.
Figure 4:
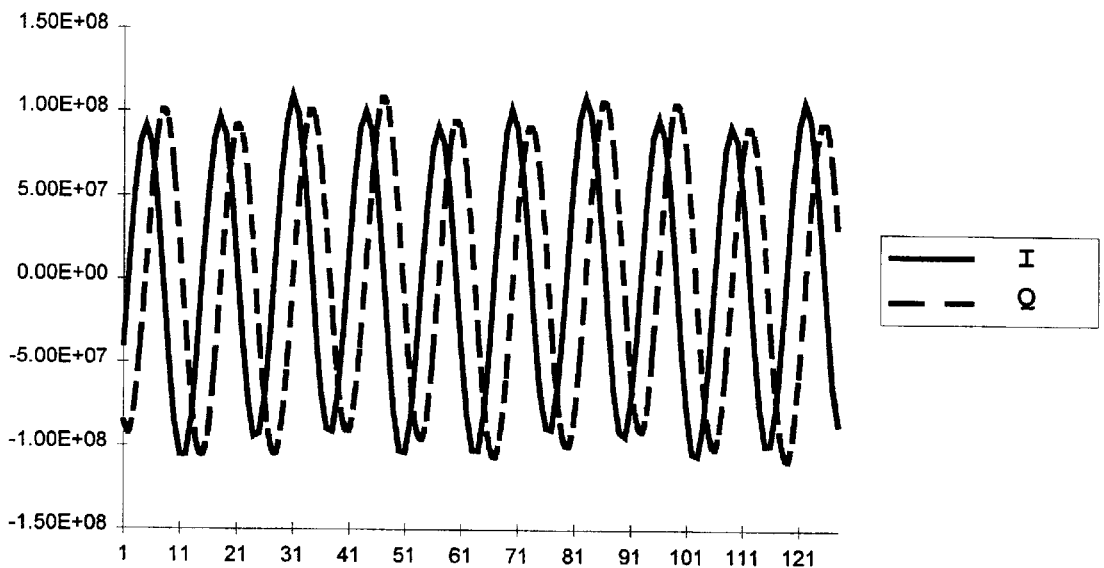
FIG. 4 illustrates the time domain characteristics of the leakage signal.

Referring to FIG. 2, illustrating a block diagram of signal processing in accordance with a first embodiment of a fully digital dynamic leakage calibration and removal system in a LFM-CW automotive radar system, the down-converted radar signal 200 from the second mixer 18.4, and a phase shifted version thereof, are converted in step 202 by ADC's 26.1, 26.2 to form the in-phase (I) and quadrature-phase (Q) signals. In step 204, the DC bias and I/Q imbalance is removed so as to provide the I and Q waveforms corresponding to the associated down-converted radar signal 200, as illustrated in FIG. 4.

The down-converted radar signal comprises the sum of the leakage signal with the received radar return signal. The received radar return signal is Doppler shifted by moving targets. The leakage signal however has a constant frequency that is the same as the transmit frequency, as for the radar return from stationary targets, but generally with a much stronger magnitude than radar return signals.

Pre-computed leakage signals for each beam location of the multi-beam radar system are initially stored with the program code in EPROM in the form of the associated I and Q waveforms—a separate leakage signal for each beam location. The leakage signals are inherently synchronized with the associated radar carrier and chirp signals because of the coherency resulting from direct digital synthesis thereof. The signal processor 30 subtracts the complex I/Q waveforms of the leakage signal from the incoming In-phase and Quadrature sampled complex I/Q radar signal in step 206 and performs traditional LFM waveform processing, consisting of Fast Fourier Transform (FFT) in step 208 and Constant False Alarm Rate (CFAR) detection processing in step 210. The process of CFAR detection is known to those of ordinary skill in the art, for example as described in "Radar CFAR Thresholding in Clutter and Multiple Target Situations" by Hermann Rholing in IEEE Transactions on Aerospace and Electronic Systems, Vol. AES-19, No. 4, July 1983, which is incorporated herein by reference. The output of the CFAR detector is a list of possible target reports 212, which includes:

1. range cell location
2. beam number of active beam in the associated multi-beam system
3. amplitude of signal
4. amplitude of background The leakage signal is tested in step 214 by a leakage tester which is preset to know the possible range cell locations of the leakage signal, based on the fact that the leakage location is roughly constant, to within 1–2 range cells, for a specific radar hardware configuration. The tester analyzes both the amplitude and the modality of the leakage signal. For example, the amplitude of the leakage signal in range space (after FFT) is compared with threshold of approximately 5 dB, wherein a rise greater than the threshold indicates an incorrect leakage signal. Also, for example, the modality of the leakage signal is tested using $3^{rd}$ order moments in FFT amplitude space. If the leakage signal being used is incorrect, the amplitude of the leakage will grow and the signal may also experience a drift in frequency causing it to move in range and now appear as two closely spaced peaks, rather than a single peak.

If the resultant leakage report is within tolerance, then the system continues with normal operation and nothing is done. If the leakage report appears out of tolerance, then a leakage tolerance flag is set. If this flag is set m-of-N times on the next N times the radar uses a particular beam, then in step 216 the system is flagged to begin a new beam calibration. The values of m and N are typically chosen to be 3-of-4. Alternately, a calibration may be automatically rescheduled every 100 scans. The system uses the latest valid leakage signal for processing incoming radar signals.

If the system is flagged to begin a new calibration, then on the next pass of the radar for the particular beam, the raw I/Q radar data is directed through both the normal processing chain, as well as into the leakage calibration process 250. In step 252, a running sum filter that averages out any possible thermal Gaussian noise by computing the running sum for each step in the sequential frequency stepped LFM radar signal. This summation process continues at each beam location for M occurrences when the antenna is returned to the particular beam location, where values of M between 25 to 100, for example, provide excellent noise reduction. The running sum is performed independently on the I and Q channels of the complex data to preserve the phase of the resulting leakage signal. This running sum is performed at each time sample of the repetitive LFM waveform kernel (chirp) over the M-plurality of successive waveform cycles. For example, for time sample 1 in the incoming waveform, 25–100 instances of that value are summed together. This processing step then generates an associated averaged waveform that corresponds to the incoming data sequence for each LFM data collection interval.

The averaged waveform is then filtered in steps 254, 256, and 258 to remove known targets while preserving the main leakage signal and any images of the leakage signal which may be present due to limited image rejection capabilities of the various mixers in the system. Such filtering may be achieved by first, in step 254, transforming the averaged waveform into range space using an FFT; then, in step 256, removing the associated targets with a notch filter; and finally, in step 258, transforming the filtered signal back to the time domain using an inverse FFT. The notch filter in step 256 utilizes the report list 212 from the CFAR detection step 210 to identify the targets for removal from the averaged waveform. Alternately, this filtering process may be implemented in the time domain.

Generally targets appear as higher frequency signals in the LFM waveform than the leakage signal since they are farther in range than the leakage. If the targets were not removed from the averaged waveform as described hereinabove, then if the system were stationary and there were other objects in the radar's field of view, then these objects would be incorporated into a resulting corrupted leakage signal, and accordingly calibrated out by the system along with the leakage. However, when the system began moving again, the calibration using the corrupted leakage signal would then make a false target appear at that same location for all subsequent scans, because when the corrupted leakage signal is subtracted, then the subtraction process effectively adds signal components into the incoming waveform where not are present therein.

The filtered signal is then, in step 260, scaled to be of unity amplitude to provide for easier scaling in the leakage subtraction logic step 206, wherein the stored leakage signal is scaled to match the peak value of the incoming I/Q signal before subtraction therefrom.

In conjunction with the calculation of the average waveform in step 252, variance waveforms of the I and Q channels are computed for use as a diagnostic measure and verify the quality of the leakage signal. The variance of the I and Q channels is checked in step 262 before storing, in step 264, the computed leakage signal from step 260 as the leakage reference signal, so as to prevent a very poor quality leakage reference signal from being generated if the system is experiencing radar front-end hardware problems. If the variance check fails, for example as a result of the variance of any point in the variance waveforms being more than 5 times greater than an adjacent point, then the computed leakage signal from step 260 is discarded, and the leakage calibration process 250 is repeated. If after a second attempt the variance signal is still out of tolerance, a diagnostics flag is set and the system enters a self-test mode, for example by switching the MBA to a non-radiative mode so that the radar system only measures internal leakage.

If in step 262 the variance of the leakage signal is within tolerance, then the calculated leakage signal is stored in step 264 as the leakage reference signal for subsequent use in removing leakage from incoming radar signals.

Figure 3:
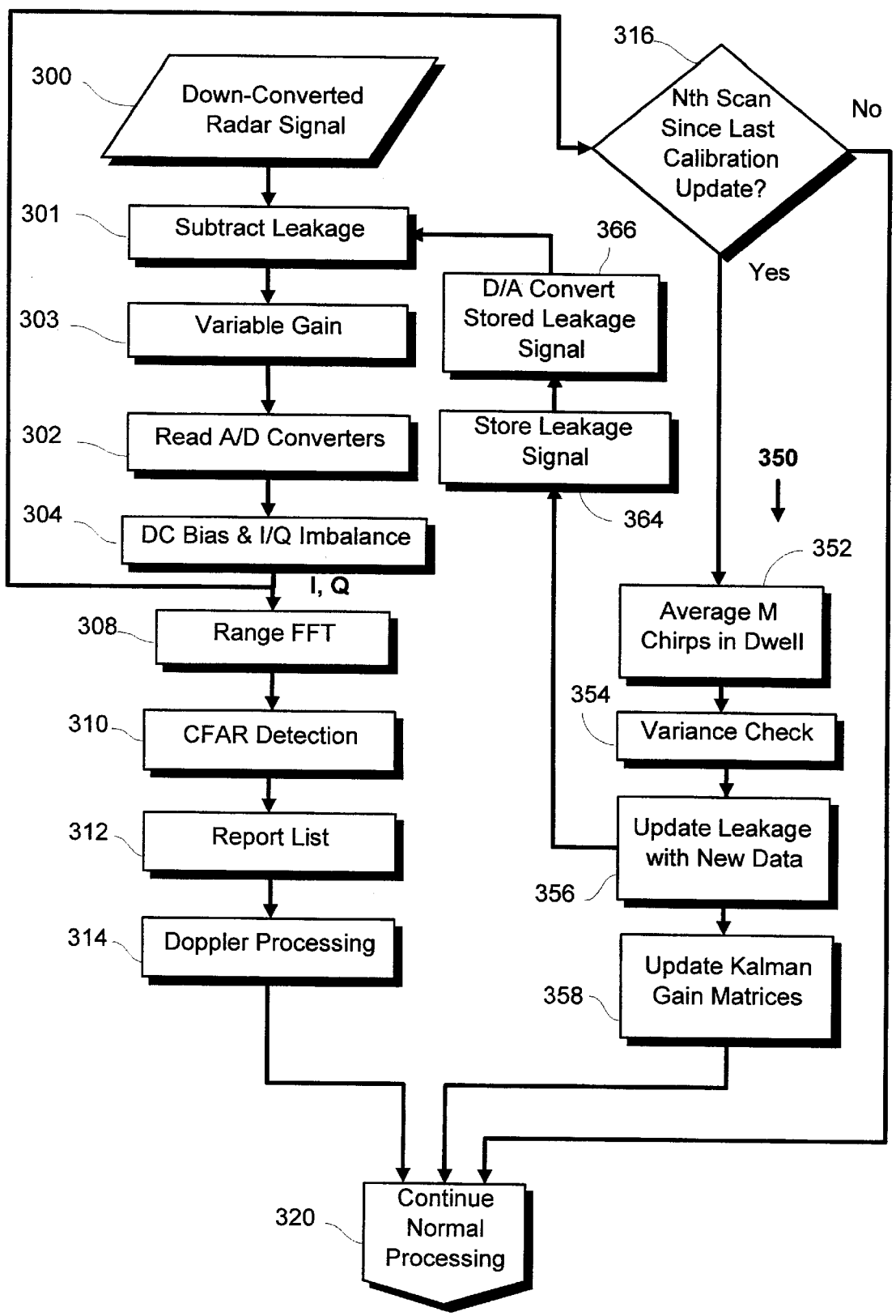
FIG. 3 illustrates a block diagram of signal processing in accordance with a second embodiment of the instant invention.

Referring to FIG. 3, illustrating a block diagram of signal processing in accordance with a second embodiment of a hybrid analog/digital dynamic leakage calibration and removal system in a LFM-CW automotive radar system, a stored digital leakage signal from step 364 is converted to analog form by a DAC 34 in step 366. The system begins normal operation with a pre-computed leakage signal that is stored with the program code in EPROM, wherein a distinct leakage signal is associated with and stored for each beam location. The stored leakage signal from step 366 is subtracted in step 301 from the down-converted radar signal 300, and the resultant signal is scaled by a variable-gain amplifier in step 303, wherein the gain thereof is under control of the signal processor 30 as described hereinbelow. The scaled signal and a quadrature phase shifted version thereof are sampled and converted to the associated digital, complex I/Q signals in steps 302 and 304. The (FFT) in step 308, Constant False Alarm Rate (CFAR) detection processing in step 310 and Doppler processing in step 314 across a set of N complete LFM waveforms for each range cell that reported a detection. The output of the CFAR detector is a list of possible target reports 312, which includes:

1. range cell location
2. beam number
3. amplitude of signal
4. amplitude of background
5. Doppler (speed) of target Every $N^{th}$ scan of incoming radar data, where for example N is approximately 100, in step 316 the leakage calibration process 350 is performed (in addition to normal radar signal processing) to track and update the leakage signal. In step 352, M chirps comprising a complete radar dwell at a particular beam location are average to reduce thermal Gaussian noise, where for example M is between 8 and 16 chirps at each beam location (dwell) for adequate noise reduction and Doppler sensitivity and accuracy in the normal radar processing. The average is calculated independently on the I and Q channels of the complex data to preserve the phase of the leakage signal, so as to generate a leakage signal waveform with a length equal to the incoming chirp length, for example 64–128 points. The average is calculated across the respective chirp waveforms, respective points with in each waveform averaged with one another so as to create an average waveform.

In addition to the above described averaging process, the associated variance waveforms of the I and Q channels are also computed, from which the system in step 354 performs diagnostics to verify the quality of the leakage signal by comparing the measured variances to the associated stored variances for the I and Q channels that are used in the Kalman Filter stage. This variance check guards against generating poor quality leakage reference signals, for example as a result of front-end hardware problems in the radar system. A poor variance causes the system to discard the just computed leakage reference signal and to calculate another. If after a second attempt the variance signal is still out of tolerance a diagnostics flag is set and the system enters a self-test mode.

This averaged I/Q waveform has the appearance of a sinewave as shown in FIG. 4. Drifts of the leakage signal tends to cause small perturbations in the associated waveform This averaged I/Q waveform has the appearance of a sinewave as shown in FIG. 4. Drifts of the leakage signal tends to cause small perturbations in the associated waveform over time. The instant invention treats each point of this waveform independently and runs a Kalman filter over time on each point using the new incoming data to provide a correction to the existing data in step 356 after which the associated Kalman Gain matrices are updated in step 358. The form of the filter is well known to those of ordinary skill in the art as:

$$\text{est\_leak}(i) = \text{pred\_old\_leak}(i) + \text{Gain}*(\text{signal}(i) - \text{pred\_old\_leak}(i)) \tag{1}$$

and $$\text{pred\_old\_leak}(i) = S*\text{est\_leak}(i-1) \tag{2}$$

where est_leak is the estimated new leakage value, signal is the incoming new signal data, pred_old_leak is the prediction from the filter of what the leak should be at this new time i, and the state transition matrix is:

$$S = \begin{pmatrix} 1 & \Delta T \\ 0 & 1 \end{pmatrix} \tag{3}$$

where $\Delta T$ is the time between updates.

est_leak(i) is a 2 element vector, the first element of which is the In Phase contribution of the signal and the second of which is the Quadrature contribution of the signal. This form takes advantage of the fact that the In-Phase is proportional to cos(t) and the Quadrature portion is proportional to the sin(t) which is simply the time derivative (or in this application, velocity).

The Gain matrix is a 2×2 matrix defined by:

$$\text{Gain} = P_{pred} * M^T * (M * P_{pred} * M^T + N_M)^{-1} \tag{4}$$

where $$P_{Pred} = S * P_{est} * S^T + N_S \tag{5}$$

and $$P_{est} = (I - \text{Gain} * M) P_{Pred} \tag{6}$$

where $P_{Pred}$ is the covariance of the Predicted leak value, $P_{est}$ is the covariance matrix for the estimated leak, and M is the measurement matrix which is the Identity matrix in this application, as is I.

The matrices $N_M$ and $N_S$ are the measurement noise matrix and the system noise matrix respectively, and are given by:

$$N_M = \begin{pmatrix} \sigma_I^2 & 0 \\ 0 & \sigma_Q^2 \end{pmatrix} \tag{7}$$

and $$N_S = \begin{pmatrix} \sigma_{11}^2 & \sigma_{12}^2 \\ \sigma_{21}^2 & \sigma_{22}^2 \end{pmatrix} \tag{8}$$

Figure 5:
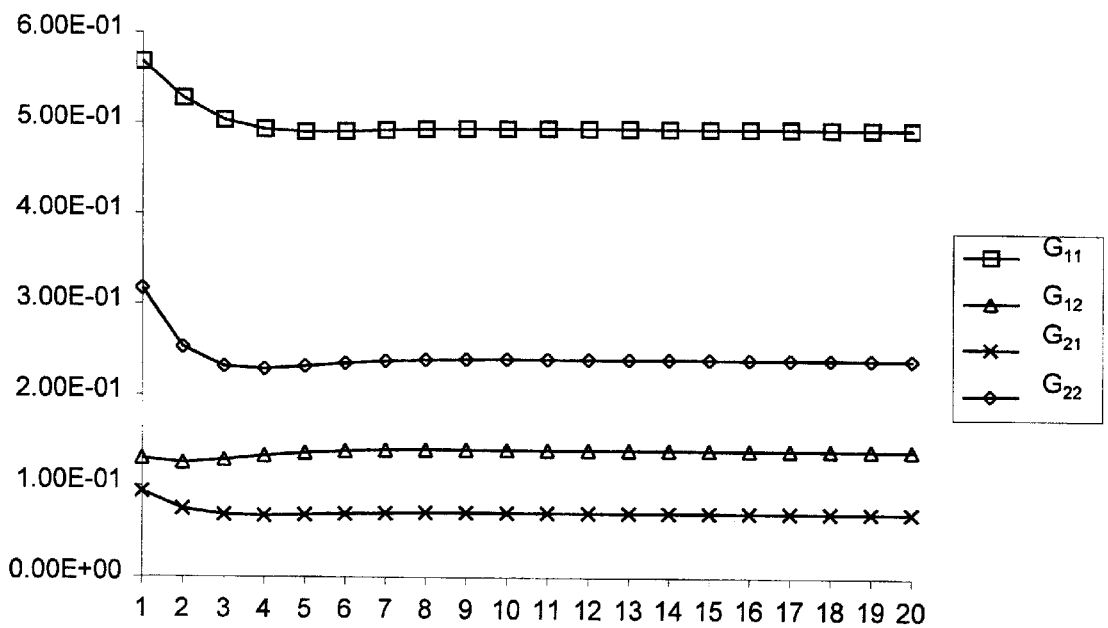
FIG. 5 illustrates the values of the Kalman gain matrix over time.

The system noise matrix models the random 'accelerations' (Quadrature derivative) that are driving the system to drift over time. The variances $\sigma_I^2$ and $\sigma_Q^2$ are the respective variances of the I and Q channels that are estimated when the system is developed and compared to the variances of the incoming data in step 354 to ensure performance. The second set of variances in the system noise matrix are determined by modeling the system drift characteristics during development, for example by sampling the data at hourly intervals, where the indices 1 and 2 of the variances correspond to I and Q respectively. These elements of the system noise matrix can be also be adjusted to tune the system. The system begins with an estimate for these matrices and $P_{est}$ to initiate the processing. $P_{est}$ is estimated during system development based on what the desired Gain matrix characteristics should be. The Gain matrix changes with each iteration as seen in FIG. 5 which plots the evolution of each term over time.

One peculiarity of the system that has no impact on the overall performance for a predictive collision application is that if the system were stationary and there were other objects in the radar's field of view, then they would be calibrated out as well. When the system began moving again, the calibration signal would then make a false target appear at that same location for all subsequent scans. This is because when a leakage signal is subtracted, if no corresponding signal is present, then the subtraction process effectively adds the signal into the incoming waveform. This causes no problems with collision predictions since stationary targets (relative to the host vehicle) cannot collide therewith and are therefore no threat. Also these false targets are eventually calibrated out after the next set of scans passes and the leakage calibration process 350 is executed again.

The newly updated leakage signal from step 356 is then in step 364 stored in processor memory and subsequently used in place of the EPROM based leakage signal that was factory delivered with the automotive radar system. However, the EPROM is not overwritten, but is instead available to prevent the calibration from "wandering" too far from the factory programmed calibration.

The system dynamic range is cost effectively improved converting in step 366 the stored digital leakage signal from step 364 to an analog signal by a Digital to Analog Converter (DAC), which is then subtracted in step 301 from the down-converted radar signal 300. The resulting difference signal is amplified in step 303 by a variable gain amplifier 38 to take advantage of the Analog to Digital Converter's (ADC's) available dynamic range, so as to decrease the noise due to quantization error and increase the system dynamic range, the improvement bounded by the condition where quantization noise falls below the system noise floor. Increasing the system dynamic range allows smaller targets to be detected by the system.

An ADC's dynamic range, as expressed by the associated signal-to-quantized-noise ratio, is determined by the associated number of bits in the ADC:

$$SQNR_{ADC} = 20*\log\left(\frac{P_x}{P_Q}\right) = 20*\log\left(\frac{3}{2}*2^{2*(b+1)}\right) \quad (9)$$

Where:

$$P_x = \frac{A^2}{2} \quad (10)$$

$$P_Q = \frac{A^2/3}{2^{(b+1)}} \quad (11)$$

$P_X$=Power of maximum signal
$P_Q$=Power of a quantization step
A=Amplitude of the maximum Signal
b=number of bits The radar return is composed of 2 signal components, the leakage signal and target signal. The composite signal is $P_c = P_{Leakage} + P_{Target}$. $P_c$ must be set less than or equal to $P_X$ to avoid ADC overflow. If $P_c$ is set equal to $P_X$, then the available SQNR for target detection is decreased by the Leakage-to-Target Ratio(LTR), which is equal to $10*\log(P_{Leakage}/P_{Target})$, which for example is typically 40–80 dB.

Converting the leakage signal back to analog form enables an increase in the system's dynamic range available for target detection. The leakage template—the digital form of the leakage calibration signal—power $P_{LT}$ is equal to the power $P_L$ of the leakage minus the quantization error of the DAC:

$$QN_{DAC} = \frac{A_{Leakage} 2/3}{2^{(m+1)}} \quad (12)$$

$$P_{LT} = P_L - QN_{DAC} \quad (13)$$

were m is the number of bits in the DAC

Subtracting the leakage template signal from the radar composite signal gives:

$$P_{Diff} = P_C - P_{LT} = P_{Target} + QN_{DAC} \quad (14)$$

The difference signal is amplified by a gain G, and the power of the resulting amplified signal is given by:

$$P_{Gain} = G*(P_{Target} + QN_{DAC}) \quad (15)$$

Preferably G is set so that $P_{Gain}$ is equal to the $P_X$ of the ADC.

Notwithstanding that $P_{Leakage}$ is subtracted, the value of the leakage signal is still known, so the system SQNR is equal to $$SQNR_{System} = \frac{(P_{Leak}*G + P_X)}{P_Q} = G*\frac{3}{2}*2^{2*(b+1)} \quad (16)$$

If $QN_{DAC}$ is larger than $P_{Target}$, G becomes equivalent to $1/QN_{DAC}$ and SQNR becomes $$SQNR_{System} = 10*\log(3/2*2^{2*(b+m+1)}) \quad (17)$$

This illustrates that if the sum of the bits in the ADC and DAC, i.e. b+m, in the hybrid embodiment is equal to the number of bits in the ADC, i.e. b, in the corresponding digital embodiment, then the same system signal-to-noise ratio can be achieved with the relatively inexpensive combination of a low resolution ADC and DAC in the hybrid embodiment as can be achieved with a single relatively expensive high resolution ADC in the purely digital embodiment.

For both embodiments of the instant invention, the leakage calibration system is designed to track long term changes in the behavior of the leakage signal. For instance, the variation in temperature that would cause the system to drift out of tolerance can take on the order of a few hours to cause thermal heating sufficient enough to cause the radar assembly to thermally expand out of tolerance. The system, however, can also react on a more rapid basis if, for instance, a large quantity of mud were splashed onto the radar and it effected the characteristics of the radome. Short term effects, such as unusual power surges that may cause the LFM waveform to be corrupted would not effect the leakage calculation since these are either of short duration, or if longer duration would be flagged by the variance test on the leakage reference signal calculation and would flag the control processing task of the radar of a potential system failure that requires immediate service attention.

Figure 6:
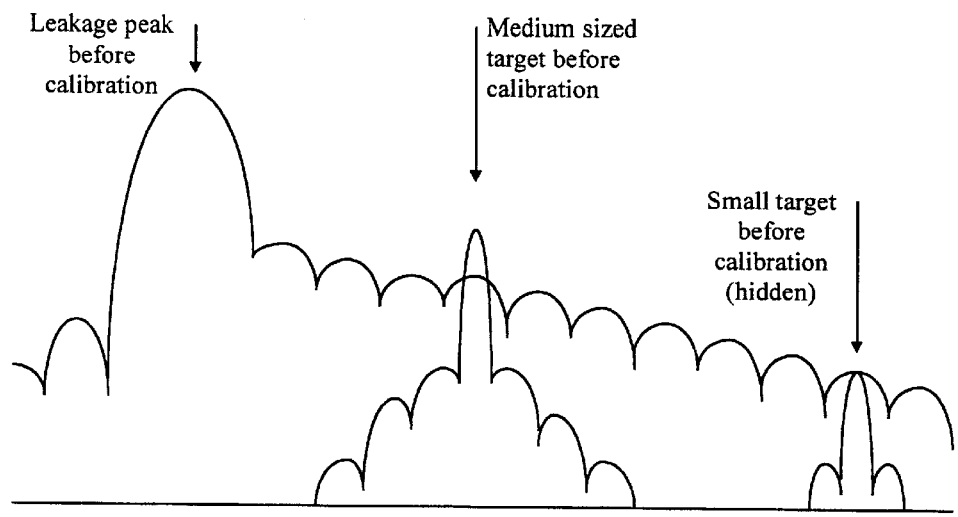
FIG. 6 illustrates a radar return amplitude scan corrupted by leakage.
Figure 7:
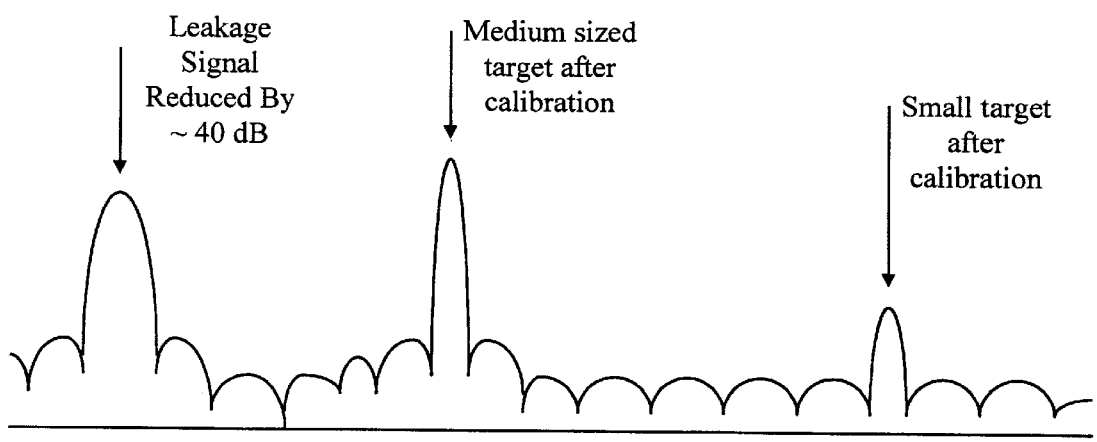
FIG. 7 illustrates a radar return signal after removal of the leakage component in accordance with the instant invention.

As an example of the operation of the instant invention, referring to FIG. 6, the original uncompensated leakage signal is shown to dominate the target spectrum. Even medium sized targets are much harder to detect since their amplitude relative to the background is significantly reduced. Smaller targets are completely masked by the background of the leakage signal. Referring to FIG. 7, responsive to the instant invention the leakage is reduced significantly by the above described dynamic leakage calibration process, enabling the targets to be much easier to detect relative to the background clutter and noise.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A method of removing leakage in a continuous wave radar system, comprising:
   a. sampling the in-phase and quadrature-phase components of a down-converted radar return signal, each said component comprising an associated waveform comprising a repetitive sequence of frequencies;
   b. subtracting the in-phase and quadrature-phase components of a stored leakage signal to form a resultant signal;
   c. comparing at least one first measure from said resultant signal with a corresponding at least one first threshold; and
   d. performing a leakage calibration if said at least one first measure exceeds said corresponding at least one threshold for m of N successive samples of said radar return signal, wherein said leakage calibration comprises:
      i). calculating a running average of successive said in-phase waveforms of said down-converted radar return signal by averaging respective elements of said repetitive sequence across successive repetitive sequences so as to generate associated averaged in-phase waveform;
      ii). calculating a running average of successive said quadrature-phase waveforms of said down-converted radar return signal by averaging respective elements of said repetitive sequence across successive repetitive sequences so as to generate associated averaged quadrature-phase waveform, said in-phase waveform and said quadrature-phase waveform constituting an averaged leakage signal;
      iii). calculating at least one variance waveform associated with said averaged leakage signal;
      iv). comparing at least one second measure of said at least one variance waveform with a corresponding at least one second threshold; and
      v). storing said averaged leakage signal as said stored leakage signal if said at least one second measure of said at least one variance waveform is less than said corresponding at least one second threshold.

2. A method of removing leakage in a continuous wave radar system as recited in claim 1, whereby said stored leakage signal is initially set to a pre-computed value.

3. A method of removing leakage in a continuous wave radar system as recited in claim 1, further comprising the step of scaling said stored leakage signal responsive to the magnitude of said down-converted radar return signal.

4. A method of removing leakage in a continuous wave radar system as recited in claim 3, wherein said stored leakage signal is scaled to have the same peak magnitude as said down-converted radar return signal.

5. A method of removing leakage in a continuous wave radar system as recited in claim 1, wherein said at least one first measure comprises the maximum amplitude of the leakage component of said resultant signal.

6. A method of removing leakage in a continuous wave radar system as recited in claim 5, wherein said first measure is tested within a predetermined range of frequencies corresponding to said leakage component of said resultant signal.

7. A method of removing leakage in a continuous wave radar system as recited in claim 1, wherein said at least one first measure comprises the modality of the leakage component of said resultant signal.

8. A method of removing leakage in a continuous wave radar system as recited in claim 7, wherein said at least one first threshold comprises the number of closely space peaks in the leakage component of said resultant signal.

9. A method of removing leakage in a continuous wave radar system as recited in claim 7, wherein said at least one first measure comprises the third order moment in the range domain of said leakage component of said resultant signal.

10. A method of removing leakage in a continuous wave radar system as recited in claim 1, further comprising the step of scaling said averaged leakage signal prior to storing said averaged leakage signal.

11. A method of removing leakage in a continuous wave radar system as recited in claim 9, wherein said continuous wave radar system is step linear frequency modulated, further comprising the step of processing said down-converted radar return signal so as to measure the range to zero or more targets represented by said radar return signal.

12. A method of removing leakage in a continuous wave radar system as recited in claim 9, wherein the step of processing said down-converted radar return signal comprises the steps of Fast Fourier Transformation and Constant False Alarm Rate detection processing.

13. A method of removing leakage in a continuous wave radar system as recited in claim 12, wherein said Constant False Alarm Rate detection processing step provides at least one measure selected from the group consisting of the range cell location, the radar beam number, the amplitude of said radar return signal and the amplitude of the background of said radar return signal.

14. A method of removing leakage in a continuous wave radar system as recited in claim 13, further comprising the step of removing targets detected by said Constant False Alarm Rate detection processing step from said averaged leakage signal.

15. A method of removing leakage in a continuous wave radar system as recited in claim 14, wherein the step of removing targets comprises the steps of Fast Fourier Transforming said averaged leakage signal so as to form a frequency domain signal, notch filtering said frequency domain signal responsive to said targets detected by said Constant False Alarm Rate detection processing step so as to form a notch filtered signal, and inverse Fast Fourier Transforming said notch filtered signal so as form a replacement for said averaged leakage signal.

16. A method of removing leakage in a continuous wave radar system as recited in claim 13, wherein said step of performing a leakage calibration is performed when no targets are detected in said Constant False Alarm Rate detection processing step.

17. A method of removing leakage in a continuous wave radar system as recited in claim 1, wherein said continuous wave radar system comprises a multiple beam array, said stored leakage signal is distinct for each beam location in said multiple beam array, and said step of performing a leakage calibration is performed separately for each beam location in said multiple beam array.

18. A method of removing leakage in a continuous wave radar system, comprising:
   a. subtracting a stored leakage signal from a down-converted radar return signal so as to form a resultant signal, wherein said down-converted radar return signal comprises a repetitive sequence of frequencies; and b. performing a leakage calibration every $N^{th}$ occurrence of said repetitive sequence of frequencies, wherein said leakage calibration comprises:
   i). calculating an average of successive resultant signals by averaging respective elements of said repetitive sequence across successive repetitive sequences so as to generate associated averaged leakage signal;
   ii). calculating at least one variance waveform associated with said averaged leakage signal;
   iii). comparing at least one measure of said at least one variance waveform with a corresponding at least one threshold;
   iv). combining said stored leakage signal with said averaged leakage signal in accordance with a Kalman Filter so as to form an updated leakage signal if said at least one measure of said at least one variance waveform is less than said corresponding at least one threshold; and
   v). storing said updated leakage signal as said stored leakage signal.

19. A method of removing leakage in a continuous wave radar system as recited in claim 18, wherein said Kalman Filter is responsive to the noise statistics of the radar system.

20. A method of removing leakage in a continuous wave radar system as recited in claim 18, wherein said Kalman Filter is responsive to the leakage stability of the radar system.

21. A method of removing leakage in a continuous wave radar system as recited in claim 18, wherein said Kalman Filter is responsive to the stability of the radar system.

22. A method of removing leakage in a continuous wave radar system as recited in claim 18, further comprising the step of updating at least one gain matrix of said Kalman Filter.

23. A method of removing leakage in a continuous wave radar system, comprising:
   a. converting a stored leakage signal from digital to analog form so as to form an analog leakage signal;
   b. subtracting said analog leakage signal from a down-converted radar return signal so as to form a resultant signal;
   c. sampling the in-phase and quadrature-phase components of said resultant signal, each said component comprising an associated waveform comprising a repetitive sequence of frequencies; and
   d. performing a leakage calibration every $N^{th}$ occurrence of said repetitive sequence of frequencies, wherein said leakage calibration comprises:
      i). calculating an average of successive said in-phase waveforms of said down-converted radar return signal by averaging respective elements of said repetitive sequence across successive repetitive sequences so as to generate associated averaged in-phase waveform;
      ii). calculating an average of successive said quadrature-phase waveforms of said down-converted radar return signal by averaging respective elements of said repetitive sequence across successive repetitive sequences so as to generate associated averaged quadrature-phase waveform, said in-phase waveform and said quadrature-phase waveform constituting an averaged leakage signal;
      iii). calculating at least one variance waveform associated with said averaged leakage signal;
      iv). comparing at least one measure of said at least one variance waveform with a corresponding at least one threshold; and
      v). replacing said stored leakage signal with a signal from said averaged leakage signal if said at least one measure of said at least one variance waveform is less than said corresponding at least one threshold.

24. A method of removing leakage in a continuous wave radar system as recited in claim 23, further comprising the step of scaling said resultant signal.

25. A method of removing leakage in a continuous wave radar system as recited in claim 24, wherein the step sampling the in-phase and quadrature-phase components of said resultant signal includes the step of converting said resultant signal from analog to digital form with at least one analog to digital converter, and the step of scaling said resultant signal is responsive to the dynamic range of said at least one analog to digital converter.

26. A method of removing leakage in a continuous wave radar system as recited in claim 23, wherein said continuous wave radar system is step linear frequency modulated, further comprising the step of processing said down-converted radar return signal so as to measure the range to zero or more targets represented by said radar return signal.

27. A method of removing leakage in a continuous wave radar system as recited in claim 26, wherein the step of processing said down-converted radar return signal comprises the steps of Fast Fourier Transformation and Constant False Alarm Rate detection processing, and said Constant False Alarm Rate detection processing step provides at least one measure selected from the group consisting of the range cell location, the radar beam number, the amplitude of said radar return signal and the amplitude of the background of said radar return signal.

28. A method of removing leakage in a continuous wave radar system as recited in claim 23, wherein N is between 10 and 1000.

29. A method of removing leakage in a continuous wave radar system as recited in claim 23, wherein said average is based upon 5 to 50 samples.

30. A method of removing leakage in a continuous wave radar system as recited in claim 23, wherein said continuous wave radar system comprises a multiple beam array, said stored leakage signal is distinct for each beam location in said multiple beam array, and said step of performing a leakage calibration is performed separately for each beam location in said multiple beam array.

31. A system for removing leakage in a CW radar system, comprising:
   a. a differential amplifier, the input of said differential amplifier operatively coupled to a down converted radar signal within the CW radar system;
   b. a signal processor;
   c. a memory operatively connected to said signal processor for storing a leakage signal;
   d. a digital to analog converter operatively connected to said signal processor;
   e. a gain controlled amplifier, whereby the input of said gain controlled amplifier is operatively connected to the output of said differential amplifier and the gain control of said gain controlled amplifier is operatively connected to said signal processor;
   f. a first analog to digital converter, the input of said first analog to digital converter operatively connected to the output of said gain controlled amplifier, the output of said first analog to digital converter operatively connected to said signal processor, whereby said first analog to digital converter provides an in-phase signal to said signal processor;

g. a quadrature phase shifter, the input of said quadrature phase shifter operatively connected to the output of said gain controlled amplifier; and h. a second analog to digital converter, the input of said second analog to digital converter operatively connected to the output of said quadrature phase shifter, the output of said second analog to digital converter operatively connected to said signal processor, whereby said second analog to digital converter provides a quadrature-phase signal to said signal processor, said signal processor calculates a leakage calibration signal from said in-phase and said quadrature phase signals, said signal processor outputs said leakage calibration signal to said digital to analog converter, and said differential amplifier subtracts the signal at the output of said digital to analog converter from said down converted radar signal.

32. A system for removing leakage in a CW radar system as recited in claim 31, whereby the gain of said gain controlled amplifier is responsive to the dynamic range of said first and second analog to digital converters.

* * * * *